United States Patent Office
3,501,461
Patented Mar. 17, 1970

3,501,461
AZABICYCLIC PHOSPHONATE
Peter E. Newallis, Overland Park, Kans., and Zafarullah Khan Cheema, Morristown, N.J., assignors to Allied Chemical Corporation, New York, N.Y., a corporation of New York
No Drawing. Filed Jan. 18, 1968, Ser. No. 698,728
Int. Cl. C07f 9/40; C07d 41/04; A01n 9/36
U.S. Cl. 260—239
1 Claim

ABSTRACT OF THE DISCLOSURE

A new class of azabicyclic phosphates, which are useful as insecticides and herbicides, having the general formula:

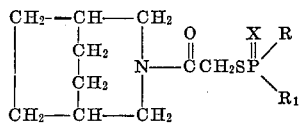

wherein X represents oxygen or sulfur, R represents an alkoxyl group having 1–5 carbon atoms, and $R_1$ represents an alkoxyl or alkyl group having 1–5 carbon atoms. The above compounds are prepared by reacting ammonium salts of phosphoric acid monoesters and diesters with N-chloroacetyl 3-azabicyclo [3.2.2] nonane.

BACKGROUND OF THE INVENTION

This invention relates to a new class of phosphates useful as insecticides and herbicides and in particular to a new class of azabicyclic phosphates useful as insecticides and herbicides.

The requirements for useful insecticides and acaricidals vary depending upon the kind of application intended. To be successful, an insecticide must be toxic to the insect to be controlled. For some applications, it is desirable that the insecticide be stable and have residual activity; for other applications, it is desirable that its useful life be short. For use by unskilled personnel, it should be relatively non-toxic to mammals; in other cases, particularly where it is to be applied only by skilled personnel, the mammalian toxicity is less of a factor. Of course, where the insecticide is to be applied to the foliage or roots of plants, or to soil in which the plant is growing, it must be nonphytotoxic, at least at the insecticidal dosage. The same considerations apply in the case of a herbicide. The herbicide must effectively control the growth of weeds or kill the weeds without harming the plant sought to be protected.

It is one object of the present invention to produce a new class of phosphates useful as insecticides, acaricides, and herbicides.

It is another object of the present invention to produce a new class of N-acetyl 3-azabicyclo [3.2.2] nonane phosphates.

It is a further object of the present invention to provide a process for producing a new class of N-acetyl 3-azabicyclo [3.2.2] nonane phosphates useful as insecticides, acaricides, and herbicides.

SUMMARY OF THE INVENTION

The following general structure represents the compounds of the invention:

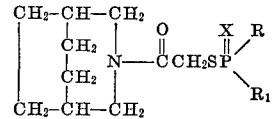

wherein X represents oxygen or sulfur, R represents an alkoxyl group having 1–5 carbon atoms, and $R_1$ represents an alkoxyl or alkyl group having 1 to 5 carbon atoms.

These compounds are viscous liquids which are soluble in many organic solvents but are essentially insoluble in water. They have outstanding acaricidal activity. Accordingly, they can be used safely and very effectively for combatting eggs and active stages of spider mites in the protection of plants. These compounds can also be used as active toxicants in compositions for the control of a number of insect organisms such as flies, beetles, roaches, cattle grubs, and aphids. Furthermore, the compounds of the present invention are very effective herbicides which may be used to control weeds such as crabgrass, Johnson grass, and wild oats with little or no injury to staple crops such as wheat, cotton, corn, soybean, and ryegrass. Moreover, the toxic potency of this class of compounds is such so as to permit their effective use as dilute solutions in soaps, sprays, paints, and oils.

DESCRIPTION OF THE PREFERRED EMBODIMENT

The synthesis of this class of phosphates may be carried out by reacting N-chloroacetyl 3-azabicyclo [3.2.2] nonane with an ammonium salt of a monoester or diester of phosphoric acid as illustrated by the following reaction:

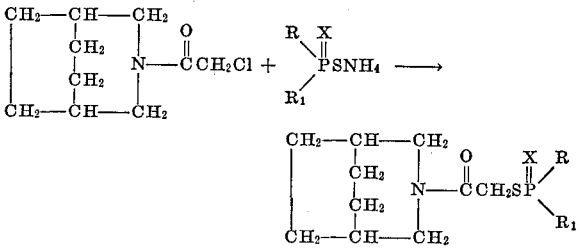

wherein X represents oxygen or sulfur, R represents an alkoxyl group containing 1–5 carbon atoms, and $R_1$ represents an alkoxyl or alkyl group having 1–5 carbon atoms. The reaction may be carried out in any common inert organic solvent such as acetone, benzene, dimethylformamide or carbon tetrachloride. Approximate stoichiometric amounts of the reactants are used. The reaction mixture is allowed to react with agitation at ambient temperatures of generally 15–35° C. and preferably 20–30° C. and at atmospheric pressure although higher pressures may be used. The mixture is allowed to react for 8–12 hours. After the completion of the reaction, the reaction mixture is filtered and the solvent is removed from the filtrate under reduced pressure. The filtrate is then taken up in a water-immiscible organic solvent, such as methylene chloride, and the resulting solution is washed three times with water. The organic layer is dried over a drying agent, such as anhydrous magnesium sulfate. After the organic layer has been dried, the organic solvent is removed under reduced pressure to produce a viscous oil residue product.

Preparation of typical compounds of the present invention are described in the following example. The example is intended to be illustrative and exemplary in character, only, is not to be considered as limiting the invention in any way. The reaction conditions can also be modified without departing from the spirit of the invention.

EXAMPLE I

To 2.0 g. of N-chloroacetyl 3-azabicyclo [3.2.2] nonane dissolved in 50 ml. of acetone there was added 2.5 g. of ammonium O,O diethyl phosphorodithioate in 150 ml. acetone. The mixture was allowed to react overnight at atmospheric pressure and at ambient temperature. After the reaction period was completed, the reaction mixture was filtered and the acetone was evaporated from the filtrate. The residue was then extracted in methylene chloride, washed three times with water and dried over magnesium sulfate. Removal of the solvent methylene chloride by evaporation under reduced pressure left 3.0 g. of an oil. The residue product is Compound 1 in Table I below.

Table I sets forth typical examples of compounds of the present invention which were prepared in the same manner as the process described in Example I.

In using the compounds of this invention as insecticides, the undesirable organism may be killed by contacting the insect directly, by contacting the insect through its habitat, or by contacting the insect through its food prior and after ingestion with toxic amounts of the compounds. Standardized tests both non-systemic and systemic were conducted to determine the effectiveness as insecticides and acaricides of the compounds listed in Table I against adult house flies (AHF) two-spotted spider mites (TSSM) Mexican bean beetle larvae (MBBL), southern armyworm larvae (SAL) and pea aphid adults (PAA).

delivered from a DeVilbiss atomizer nozzle at 20 p.s.i. The approximate volume of spray on the upper surface was 0.19 cc. and the under surface was 0.48 cc. After spraying, the deposits were allowed to dry on the plants and 5 3rd instar larvae were then confined on each plant with 6 inch screen wire spheres. Mortality and feeding records were made 3 days after treatment.

TEST II

Non-systemic test for pea aphid adults (PAA)

A solution consisting of 4.8 grams of Compound 1 was mixed in 100 cc. of acetone. The solution was diluted with water so that the concentration of Compound 1 was 1 oz./100 gal.

English broad bean plants were sprayed for 2 seconds on upper surface and 5 seconds on under surface with this solution. Adult female aphids (10 per test) were brushed from infested broad bean plants into 5 inch screen wire hemispheres and sprayed for 5 seconds (approx. 0.6 cc. delivery per second from nozzle). Spray

TABLE I

| Compound No. | Compound | Analysis Calculated | Found |
|---|---|---|---|
| 1 | $CH_2$—CH—$CH_2$ / $CH_2$ / N—$\overset{O}{\overset{\|}{C}}CH_2S\overset{S}{\overset{\|}{P}}(OC_2H_5)_2$ / $CH_2$ / $CH_2$—CH—$CH_2$ | C=47.8, H=7.4 | C=48.4, H=7.7 |
| 2 | $CH_2$—CH—$CH_2$ / $CH_2$ / N—$\overset{O}{\overset{\|}{C}}CH_2S\overset{S}{\overset{\|}{P}}\overset{OC_2H_5}{\diagdown CH_3}$ / $CH_2$ / $CH_2$—CH—$CH_2$ | | |
| 3 | $CH_2$—CH—$CH_2$ / $CH_2$ / N—$\overset{O}{\overset{\|}{C}}CH_2S\overset{O}{\overset{\|}{P}}(OC_2H_5)_2$ / $CH_2$ / $CH_2$—CH—$CH_2$ | C=50.0, H=7.76 | C=51.2, H=8.2 |
| 4 | $CH_2$—CH—$CH_2$ / $CH_2$ / N—$\overset{O}{\overset{\|}{C}}CH_2S\overset{S}{\overset{\|}{P}}(OC_2H_3)_2$ / $CH_2$ / $CH_2$—CH—$CH_2$ | C=44.6, H=6.8 | C=45.1, H=7.4 |
| 5 | $CH_2$—CH—$CH_2$ / $CH_2$ / N—$\overset{O}{\overset{\|}{C}}CH_2S\overset{S}{\overset{\|}{P}}(OCH_3H_7n)_2$ / $CH_2$ / $CH_2$—CH—$CH_2$ | | |
| 6 | $CH_2$—CH—$CH_2$ / $CH_2$ / N—$\overset{O}{\overset{\|}{C}}CH_2S\overset{S}{\overset{\|}{P}}(OC_3H_7i)_2$ / $CH_2$ / $CH_2$—CH—$CH_2$ | | |

The following non-systemic tests were performed to illustrate the use of the compounds of Table I in controlling insects and acarids. The results of the tests are listed in Table II.

TEST I

Non-systemic primary test for Mexican bean beetle larvae (MBBL)

A solution consisting of 4.8 gm. of Compound 1 was mixed in 100 cc. of acetone. The solution was diluted with water so that the concentration of Compound 1 was 1 oz./100 gal.

Horticultural (cranberry) bean plants, in 2½ inch pots with all foliage removed except one primary leaf, were sprayed with the solution for 2 seconds on the upper surface and 5 seconds on the under surface. The spray was applied from a DeVilbiss atomizer nozzle at 20 p.s.i., with the aphids 15 inches from nozzle. Following treatment, aphids were caged over previously sprayed plants and mortality records were usually made 3 days later.

TEST III

Non-systemic primary test for southern armyworm larvae (SAL)

A solution consisting of 4.8 gms. of Compound 1 was mixed in 100 cc. of acetone. The solution was diluted with water so that the concentration of Compound 1 was 4 oz./100 gal.

Horticultural (cranberry) bean plants, in 2½ inch pots with all foliage removed except one primary leaf, were sprayed with the solution for 2 seconds on the upper surface and 5 seconds on the under surface. The spray was delivered from a DeVilbiss atomizer nozzle at 20 p.s.i. The approximate volume of spray on the upper surface was 0.19 cc. and the under surface was 0.48 cc. After spraying, the deposits were allowed to dry on the plants and 5 4th and 5th instar larvae were then confined on each plant with 6 inch screen wire spheres. Mortality and feeding records were made 3 days after treatment.

TEST IV
Non-systemic primary test for two-spotted spider mites (TSSM)

A solution was prepared of 4.8 gm. of Compound 1 in 100 cc. of acetone. The solution was diluted with water to a concentration of 8 oz./100 gal. of Compound 1.

Young horticultural (cranberry) bean plants in 2½ inch pots were infested with mites (all stages) one day before treatment. In treating plants the upper surface was sprayed with the solution for two seconds and the lower or under surface was sprayed for five seconds. The spray was delivered from a DeVilbiss atomizer nozzle operated at 20 p.s.i. with the plant about 18" from nozzle. The approximate volume of spray on the upper surface was 0.13 cc. and on the lower surface was 0.32 cc. Following the treatment, the potted plants were placed in irrigated trays in the greenhouse and initial kills of adults were recorded 3 days later. Residual and ovicidal observations were made 7–8 days after treatment, which allowed ample time for the eggs to hatch under greenhouse conditions. One leaf from each plant was used to make 3-day counts, and the remaining leaf on each plant was used to determine residual and ovicidal activity.

TEST V
Non-systemic primary test for house fly adults (HFA)

Dry food (6 parts powdered non-fat dry milk, 6 parts granulated sugar and 1 part powdered egg) was mixed with an acetone solution of Compound 1 so that the food contained 0.125% of the compound. The mixture was allowed to dry and then repulverized. Wettable powders are mixed with the dry food with the aid of motar and pestle. The treated food was placed in emergence cages containing 50 fly pupae. Cages containing untreated food were used as checks. Examination of each cage was made periodically for 8 days to determine emergence, condition of flies, and acute toxicity.

Similar tests were performed for Compound 2, the results of which are disclosed with those of Compound 1 in Table II. The compounds of the present invention were very effective insecticides except in the case of the southern armyworm.

TABLE II.—RESULTS OF NON-SYSTEMIC PRIMARY TESTS

| | Percent Mortality | | | | |
| --- | --- | --- | --- | --- | --- |
| Compound No. | MBBL, Test I, 1 oz./ 100 gal. | PAA, Test II, 1 oz./ 100 gal. | SAL, Test III, 4 oz./ 100 gal. | TSSM, Test IV, 8 oz./ 100 gal. | HFA, Test V, Percent 9-day kill |
| 1 | 25 | 50 | 0 | 100 | 98.0 |
| 2 | 100 | 100 | 0 | 100 | 100 |

The same compounds were then put through systemic primary tests. The systemic primary tests were conducted for MBBL, PAA, SAL, and TSSM.

TEST VI
Systemic primary test for mexican bean beetle larvae (MBBL)

A standard acetone solution containing 4.8 gms. of Compound 1 per 100 cc. of acetone was diluted with water to 4 oz./100 gals. of $H_2O$. After dilution, 100 cc. of the solution were placed in glass jars, along with the test plants (young horticultural (cranberry) bean plants) whose roots have been washed free of soil. The roots of the test plants were in contact with the bottom of the container. Aluminum foil was fitted over the top of the container and around the stem of the plants to lessen possible fumigant effects of the compounds tested. The insects were placed on the plants within 24 hours after treatment and the mortality records were made 3 days later.

TEST VII
Systemic primary test for pea aphid adults (PAA)

A standard acetone solution containing 4.8 gms. of Compound 1 per 100 cc. of acetone was diluted with water to 4 oz./100 gals. $H_2O$. After dilution, 100 cc. of the solution were placed in glass jars, along with the test plants (young English broad bean plants) whose roots have been washed free of soil. The roots of the test plants were in contact with the bottom of the container. Aluminum foil was fitted over the top of the container and around the stem of the plant to lessen possible fumigant effects of the compounds tested. The insects were placed on the plants within 24 hours after treatment and the mortality records were made 3 days later.

TEST VIII
Systemic primary test for southern armyworm larvae (SAL)

A standard acetone solution containing 4.8 gms. of Compound 1 per 100 cc. of acetone was diluted with water to 4 oz./100 gals. of $H_2O$. After dilution, 100 cc. of the solution were placed in glass jars, along with the test plants (young horticultural (cranberry) bean plants) whose roots have been washed free of soil. The roots of the test plants were in contact with the bottom of the container. Aluminum foil was fitted over the top of the container and around the stem of the plant to lessen possible fumigant effects of the compounds tested. The insects were placed on the plants within 24 hours after treatment and the mortality records were made 3 days later.

TEST IX
Systemic primary test for two-spotted spider mites (TSSM)

A standard acetone solution containing 4.8 grams of Compound 1 per 100 cc. of acetone was diluted with water to 4 oz./100 gals. of $H_2O$. After dilution, 100 cc. of the solution were placed in glass jars, along with the test plants (young horticultural (cranberry) bean plants) whose roots had been washed free of soil. The roots of the test plants were in contact with the bottom of the container. Aluminum foil was fitted over the top of the container and around the stem of the plant to lessen fumigant effects of the compounds tested. The insects were placed on the plants within 24 hours after treatment and the mortality records were made 3 days later. The ovicidal and residual data was recorded 8 days after the treatment.

The results of Tests VI–IX for Compounds 1 and 2 are listed in Table III. It is noted that the compounds have good systemic activity against insects and acarids.

TABLE III.—RESULTS OF SYSTEMIC PRIMARY TESTS
[Percent Mortality]

| | Used in dil. of 4 oz./100 gals. $H_2O$ | | | |
| --- | --- | --- | --- | --- |
| | Test VI, MBBL | Test VII, PAA | Test VIII, SAL | Test IX, TSSM |
| Compound No.: | | | | |
| 1 | 0 | 100 | 0 | 13.8 |
| 2 | 100 | 100 | 57.2 | 100 |

Compounds 1, 2, 3, and 4 of the present invention were also tested to determine their effectiveness as herbicides. The compounds were applied at the same strength to both desirable plants and undesirable plants such as weeds to determine their effect on both types of plants. A good herbicide must be harmful to the undesirable weeds while remaining harmless to the desirable plant such as corn, cotton, etc.

TEST X

Primary and secondary emergence tests of herbicides

*Planting procedure.*—Test crop species (listed below) and test weed species were planted in metal flats (12 x 8½ x 4"). Crop species were planted in single rows of 10 corn seeds, 40 wheat seeds, 15 cotton seeds, and 15 soybean seeds per flat, and covered with 1¼ inches of soil. The soil used was a composted greenhouse potting soil consisting of one-third mixed clay and sand, one-third spent mushroom soil, and one-third peat moss. All soil components were thoroughly mixed. The pH of the soil was 6.8 to 7.2. Weed species were uniformly broadcast-seeled at the rate of one teaspoonful of ryegrass, and ¼ teaspoonful of rape, per flat, and covered with ¼ inch of soil. Three weed species, crabgrass, Johnson grass, and wild oats were planted separately in three inch square pots. Two pots of each species were planted.

*Crop species.*—Corn, *Zea mays,* Hybrid US 13; wheat, *Triticum vulgare,* variety thorne; cotton, *Gossypium hirsutum,* variety Delta Pine Lane Fox, No. 20; and soybean, *Soja wax,* variety Wilson.

*Weed species.*—Annual ryegrass, *Lolium multiflorum;* rape, *Brassica napus;* crabgrass, *Digitaria sanguinalis;* Johnson grass, *Sorghum halepense;* and wild oats, *Uvularia sissifolia.*

*Spray equipment operation.*—The spray equipment included an endless flexible steel conveyer belt 2 feet wide and 12 feet long. The speed of the belt was varied by use of a variable-speed automatic transmission, powered by a ¾ H.P. explosion-proof electric motor, a speedometer being attached to the belt drive.

The equipment further included a spray boom with nozzles, spray mixture reservoir, and accompanying lines for spray mixture and pressure supply. Air was used to supply pressure at 30 p.s.i.

The seeded flats were placed on the conveyer belt and carried beneath the spray nozzles at a speed of 1.5 m.p.h. With a No. 730,154 flat-fan type nozzle for spraying, each flat received a volume of spray equal to 80 gallons of spray mixture per acre. Immediately after spraying, the test flats were placed in aluminum trays. Water was added to the trays and allowed to remain until the surface of the soil in the flat was uniformly moist (at field capacity). After irrigation the water was drained from the trays. Additional sub-irrigation was given, as needed, to maintain moisture during the test period. No surface irrigation was applied.

(A) PRIMARY TESTS

Pre-emergence tests

Within one day after seeding, two flats were treated with each candidate chemical at a rate equivalent to 16 pounds of active chemical per acre. Application was made by dissolving the compound in acetone. Treated flats were placed in the greenhouse, watered by sub-irrigation and held for a 16 day observation period after which they were rated.

Post-emergence tests

Eight to 10 days after seeding, two equivalent flats were treated with each candidate chemical at a rate equivalent to 16 pounds of active chemical per acre. Application and post application handling was the same as for pre-emergence tests, except a 10 to 12 day observation period was used.

(B) SECONDARY TESTS

Pre-emergence tests

Application of eight and four pounds active chemical per acre was made as in primary pre-emergence tests. Post-application handling was the same.

Post-emergence tests

Application of eight and four pounds active chemical per acre was made as in primary post-emergence tests.

The effect of the herbicide on the crops was evaluated and noted in terms of the injury rating index. This index was based on scale of 0 to 10 as follows: 0=no apparent injury; 1, 2, 3=slight injury; 4, 5, 6=moderate injury; 7, 8, 9=severe injury (plants will die); 10=plants were dead. An injury rating of 3 was the maximum tolerable on crops, and a rating of 7 was the minimum tolerable on weed plants.

The results of the herbicidal tests for Compounds 1, 2, 3, and 4 in terms of injury ratings are listed in Table IV.

TABLE IV.—RESULTS OF PRE-EMERGENCE AND POST-EMERGENCE HERBICIDAL TESTS

| Amount of Compound and Type of Plant | Compound 1 | | | | | | Compound 2 | | | | | | Compound 3 | | | | | | Compound 4 | | | | | |
|---|---|---|---|---|---|---|---|---|---|---|---|---|---|---|---|---|---|---|---|---|---|---|---|---|
| | Pre-emergence | | | Post-emergence | | | Pre-emergence | | | Post-emergence | | | Pre-emergence | | | Post-emergence | | | Pre-emergence | | | Post emergence | | |
| Lbs/acre [1] | 16 | 8 | 4 | 16 | 8 | 4 | 16 | 8 | 4 | 16 | 8 | 4 | 16 | 8 | 4 | 16 | 8 | 4 | 16 | 8 | 4 | 16 | 8 | 4 |
| Corn, IR | 0 | 2 | 0 | 4 | 0 | 0 | 1 | | | 4 | | | 3 | | | 4 | | | 5 | | | 5 | | |
| Cotton, IR | 0 | 0 | 0 | 6 | 5 | 3 | 0 | | | 3 | | | 0 | | | 4 | | | 0 | | | 4 | | |
| Wheat, IR | 6 | 4 | 1 | 0 | 1 | 0 | 7 | | | 2 | | | 4 | | | 2 | | | 9 | | | 5 | | |
| Soybeans, IR | 0 | 6 | 0 | 6 | 5 | 5 | 0 | | | 5 | | | 0 | | | 7 | | | 3 | | | 8 | | |
| Ryegrass, IR | 5 | 9 | 2 | 0 | 1 | 0 | 8 | | | 2 | | | 10 | | | 5 | | | 10 | | | 2 | | |
| Rape, IR | 2 | 4 | 0 | 4 | 5 | 5 | 3 | | | 9 | | | 8 | | | 10 | | | 8 | | | 9 | | |
| Crabgrass, IR | 9.9 | 9 | 8 | | | | 9 | | | | | | 10 | | | | | | 7 | | | | | |
| Johnson grass, IR | 10 | 9 | 2 | | | | 0 | | | | | | 9 | | | | | | 0 | | | | | |
| Wild oats, IR | 9 | 4 | 0 | | | | 0 | | | | | | 0 | | | | | | 0 | | | | | |

[1] 100% active ingredient applied in 80 gal. acetone/acre.

IR=Injury rating, 0-10; 0=no injury, 10=complete kill.

As is seen from Table IV, in the case of Compound 1 in the pre-emergence tests, there was poor weed control with moderate injury to the wheat and no injury to the other crops. There was excellent control of crabgrass, Johnson grass and wild oats. The post-emergence tests resulted in moderate injury to broadleaf plants, light injury to corn and no injury to wheat or grass.

In the case of Compound 2, in the pre-emergence tests, there was fair grass control, light broadleaf weed control, but severe injury on wheat and corn. There was no injury to the cotton and soybeans. Furthermore, there was good crabgrass control but Johnson grass and wild oats were not effected by the compound. In the post-emergence tests, there was light to moderate herbicidal injury on all plants except in the case of rape where there was severe injury.

In the case of Compound 3, in the pre-emergence tests, there was excellent grass control and good broadleaf weed control with light crop injury. Furthermore, there was excellent crabgrass control and good Johnson grass control with no effect on the wild oats. In the post-emergence tests, there was severe injury to rape with moderate injury to other plants.

In the case of Compound 4, in the pre-emergence tests, there was excellent grass control and good broadleaf weed control with light to severe crop injury. There was fair crabgrass control with no effect on Johnson grass or wild oats. The post-emergence tests results indicated severe injury to rape and soybeans with moderate injury to the other crops.

What is claimed is:
1. A compound having the formula:

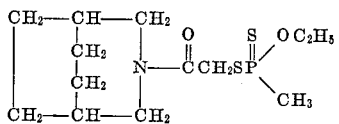

References Cited

UNITED STATES PATENTS 3,347,850  10/1967  Baker et al. _____ 260—239

FOREIGN PATENTS 1,323,949  3/1963  France.
1,355,070  2/1964  France.
1,193,953  6/1965  Germany.

ALTON D. ROLLINS, Primary Examiner

U.S. Cl. X.R.

71—86, 87; 424—200